United States Patent
Tomoeda

(10) Patent No.: US 6,484,141 B1
(45) Date of Patent: Nov. 19, 2002

(54) CONTINUOUS SPEECH RECOGNITION APPARATUS AND METHOD

(75) Inventor: Takashi Tomoeda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/453,153

(22) Filed: Dec. 2, 1999

(30) Foreign Application Priority Data

Dec. 4, 1998 (JP) .............................. 10-345153

(51) Int. Cl.⁷ .............................................. G01L 15/04
(52) U.S. Cl. ........................ 704/254; 704/231; 704/251
(58) Field of Search ................................ 704/254, 231, 704/246, 238

(56) References Cited

U.S. PATENT DOCUMENTS

| | | | | |
|---|---|---|---|---|
| 4,227,177 A | * | 10/1980 | Moshier | 704/231 |
| 4,241,329 A | * | 12/1980 | Bahler et al. | 704/231 |
| 4,481,593 A | * | 11/1984 | Bahler | 704/253 |
| 5,610,812 A | * | 3/1997 | Schabes et al. | 704/4 |
| 5,615,299 A | * | 3/1997 | Bahl et al. | 704/233 |
| 5,719,997 A | * | 2/1998 | Brown et al. | 704/256 |
| 5,870,706 A | * | 2/1999 | Alshawi | 704/251 |
| 5,878,385 A | * | 3/1999 | Bralich et al. | 704/10 |
| 5,907,634 A | * | 5/1999 | Brown et al. | 382/226 |

FOREIGN PATENT DOCUMENTS

| | | |
|---|---|---|
| JP | 6-102897 | 4/1994 |
| JP | 6-308994 | 11/1994 |
| JP | 7-104780 | 4/1995 |

OTHER PUBLICATIONS

"Language–Model Look–Ahead for Large Vocabulary Speech Recognition", by S. Ortmanns, et al., ICSLP, 1996.
"Data Driven Search Organization for Continuous Speech Recognition", by Hermann Ney, IEEE Transactions on Signal Processing, Feb. 1992.

* cited by examiner

*Primary Examiner*—Vijay Chawan
*Assistant Examiner*—Michael N. Opsasnick
(74) *Attorney, Agent, or Firm*—Scully, Scott, Murphy & Presser

(57) ABSTRACT

A continuous speech recognition apparatus includes a hypothesis storage section for storing hypotheses, a hypothesis expansion discrimination section for determining whether or not a hypothesis may be expanded to a succeeding arc, a hypothesis expansion section for expanding a hypothesis and storing a result of the expansion into the hypothesis storage section, a tree structure dictionary storage section for storing a tree structure dictionary and a context preceding to the tree structure dictionary therein, a succeeding word speech part information storage section for storing information of whether or not speech parts are included in all of succeeding words present behind each of arcs in the tree structure dictionary, a speech part connection information storage section for storing connection information between the speech parts, a language model section for providing a language model score to a hypothesis, and an acoustic model section for providing an acoustic model score to a hypothesis.

9 Claims, 4 Drawing Sheets

CONTINUOUS SPEECH RECOGNITION APPARATUS AND METHOD

BACKGROUND OF THE INVENTION

1. Field of the Invention

The present invention relates to a continuous speech recognition apparatus and method, and more particularly to a continuous speech recognition apparatus and method which achieves augmentation in speed and accuracy of recognition.

2. Description of the Related Art

As an example of a conventional continuous speech recognition apparatus, reference is had to a paper by S. Ortmanns, "LANGUAGE-MODEL LOOK-AHEAD FOR LARGE VOCABULARY SPEECH RECOGNITION", ICSLP, 1996.

The conventional continuous speech recognition apparatus is shown in FIG. 6. Referring to FIG. 6, the conventional continuous speech recognition apparatus shown includes a hypothesis storage section 1, a hypothesis expansion section 3, a tree structure dictionary storage section 4, a language model section 7, and an acoustic model section 8.

In operation, the hypothesis storage section 1 stores hypotheses therein. The tree structure dictionary storage section 4 stores words, which make an object of recognition, as a tree structure dictionary (refer to FIG. 2). The acoustic model section 8 calculates an acoustic model score for each frame. The language model section 7 calculates a language model score.

The hypothesis expansion section 3 acquires, for each frame, a structure of arcs from the tree structure dictionary storage section 4 taking an acoustic model from the acoustic model section 8 and a language model score from the language model section 7 into consideration and expands a hypothesis present on an arc to a succeeding arc. Referring to FIG. 2, a tree structure dictionary is structured such that a word is reached by tracing arcs branching in a tree structure from a root to a leaf (terminal arc).

Speech which makes an object of recognition is divided into short-time frames of a predetermined period, and such expansion as described above (that is, expansion of a hypothesis on an arc of a tree structure dictionary to a succeeding arc) is repeated from the speech beginning frame to the speech terminating frame. Then, a word through which a hypothesis which exhibits the highest score has passed in the past (a terminal of the tree structure dictionary) is finally determined as a recognition result.

Here, a hypothesis has position information of an arc on a tree structure dictionary, a history until the position is reached, and a score.

In a continuous speech recognition system wherein a plurality of words are represented as one tree structure dictionary (refer to FIG. 2), what is a word with regard to which a hypothesis is being expanded at present cannot be specified except at the terminal arc.

Therefore, although an acoustic model score is calculated for each frame, a language model score can originally be determined only when a hypothesis reaches a terminal arc of a tree structure dictionary.

Therefore, in order to add a language model score as early as possible, a method employing look-ahead of a unigram language model score and look-ahead of a bigram language model score is disclosed in the document mentioned hereinabove.

According to the look-ahead of a unigram language model score, the highest one of unigram language model scores of words settled at terminal arcs in a tree structure dictionary is provided to a predecessor arc, and the unigram language model provided to the arc is temporarily added as a language model score of the hypothesis present on the arc, and then, when the hypothesis reaches the terminal arc of the tree structure dictionary and the word is settled, the unigram language model score which has been used till then is abandoned and then the settled bigram language model score is added.

On the other hand, according to the look-ahead of a bigram language model score, when a context is determined and a new tree structure dictionary is produced, bigram language model scores regarding all words of the context are calculated, and that one of the language model scores which has the highest score is provided to a predecessor arc, and then the bigram language score provided to the arc is added as a language model score of the hypothesis present on a certain arc.

The conventional speech recognition system has the following problems.

The first problem resides in that, when look-ahead of a bigram language model score is performed, a great memory capacity and a large amount of calculation are required.

The reason is that, where look-ahead of a bigram language model score is performed, when a context is produced and a tree structure dictionary is produced newly, it is required to repeat processing of producing not part of a tree structure dictionary but an entire tree structure dictionary, calculating all bigram language model scores with respect to the context and provide language model scores of all terminal arcs in the tree structure dictionary, with which words are settled, to a predecessor arc to propagate the language model scores to all predecessor arcs.

The second problem resides in that, when look-ahead of a unigram language model score is performed, wasteful calculation is performed.

The reason is that, when look-ahead of a unigram language model score is performed, some of arcs of a tree structure dictionary may expand only to a word whose connection to the context is not permitted linguistically and the hypothesis is expanded also to such arc, in which wasteful calculation is involved.

The third problem is such as follows. If strict look-ahead of a language model score of a bigram or more is not performed using a frame synchronous beam search (for the frame synchronous beam search, for example, Hermann Ney, "Data Driven Search Organization for Continuous Speech Recognition", IEEE TRANSACTIONS ON SIGNAL PROCESSING, February, 1992 is referred to), that is, if connection possibility according to linguistic restrictions between a context and a word in a tree structure dictionary is not looked ahead, then the hypothesis is expanded also to an arc which is developed to a word whose connection to a context is not permitted linguistically as described above in connection with the second problem.

Then, if the score of the hypothesis is much higher than the others, then all hypotheses on an arc which is developed to a word whose connection to the context is permitted linguistically are excluded from the beam and thus eliminated.

As a result, in the succeeding frames, the word cannot be connected to a next word at all, and recognition processing for speech uttered later is disabled. In other words, recognition processing cannot be performed any more and a recognition result cannot be outputted.

SUMMARY OF THE INVENTION

It is an object of the present invention to provide a continuous speech recognition apparatus and method by which the recognition speed and the recognition accuracy in continuous speech recognition can be augmented.

In order to attain the object described above, according to an aspect of the present invention, there is provided a continuous speech recognition apparatus, comprising a hypothesis storage section for storing hypotheses therein, hypothesis expansion discrimination means for determining whether or not a hypothesis may be expanded to a succeeding arc, a tree structure dictionary storage section for storing a tree structure dictionary and a context preceding to the tree structure dictionary therein, a succeeding word speech part information storage section for storing information of whether or not speech parts are included in all of succeeding words present behind each of arcs in the tree structure dictionary, a speech part connection information storage section for storing connection information between the speech parts, means for providing a language model score to a hypothesis, means for providing an acoustic model score to a hypothesis, and hypothesis expansion means operable in response to an expansion instruction received from the hypothesis expansion discrimination means for acquiring a structure of an arc from the tree structure dictionary storage section and expanding a hypothesis present on the arc to a succeeding arc taking the acoustic model score and the language model score into consideration and then storing a result of the expansion into the hypothesis storage section.

According to another aspect of the present invention, there is provided a continuous speech recognition method for a continuous speech recognition apparatus which includes a hypothesis storage section for storing hypotheses therein, a tree structure dictionary storage section for storing a tree structure dictionary and a context preceding to the tree structure dictionary therein, a succeeding word speech part information storage section for storing information of whether or not speech parts are included in all of succeeding words present behind each of arcs in the tree structure dictionary, and a speech part connection information storage section for storing connection information between the speech parts, comprising the step of repeating a process for all of hypotheses present at a certain frame time, the process including the steps of acquiring a context of a tree structure dictionary to which a hypothesis belongs from the tree structure dictionary storage section, acquiring speech part connection information of the speech parts of the context from the speech part connection information storage section, acquiring arcs in the tree structure dictionary to which the hypothesis belongs from the hypothesis storage section, and repeating, for all succeeding arcs immediately succeeding the arcs, a process including the steps of acquiring, where an arc selected at present is represented as first arc and a succeeding arc immediately succeeding the first arc is represented as second arc, succeeding work speech part information of the second arc from the succeeding word speech part information storage section, discriminating from the acquired speech part connection information and the acquired succeeding word speech part information whether or not the hypothesis may be expanded from the first arc to the second arc and determining that the hypothesis must not be expanded to the second arc if a connectable speech part included in the speech part connection information is not detected behind the second arc, but determining otherwise that the hypothesis may be expanded to the second arc, expanding the hypothesis to the second arc. and discriminating whether or not the loop has been completed for all of the hypotheses and ending, when the loop has been completed for all of the hypotheses, the expanding processing of the hypotheses of the frame in a frame synchronous beam search.

With the continuous speech recognition apparatus and method, a hypothesis is prevented from being expanded to an arc to a word which cannot connect linguistically to a context. Consequently, the number of unnecessary hypotheses is minimized and the speed of continuous speech recognition is augmented as much. Further, occurrence of a situation that the score of a hypothesis to a word which cannot connect linguistically to a context is higher than those of the other hypotheses is prevented. Consequently, the recognition accuracy in continuous speech recognition is augmented.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
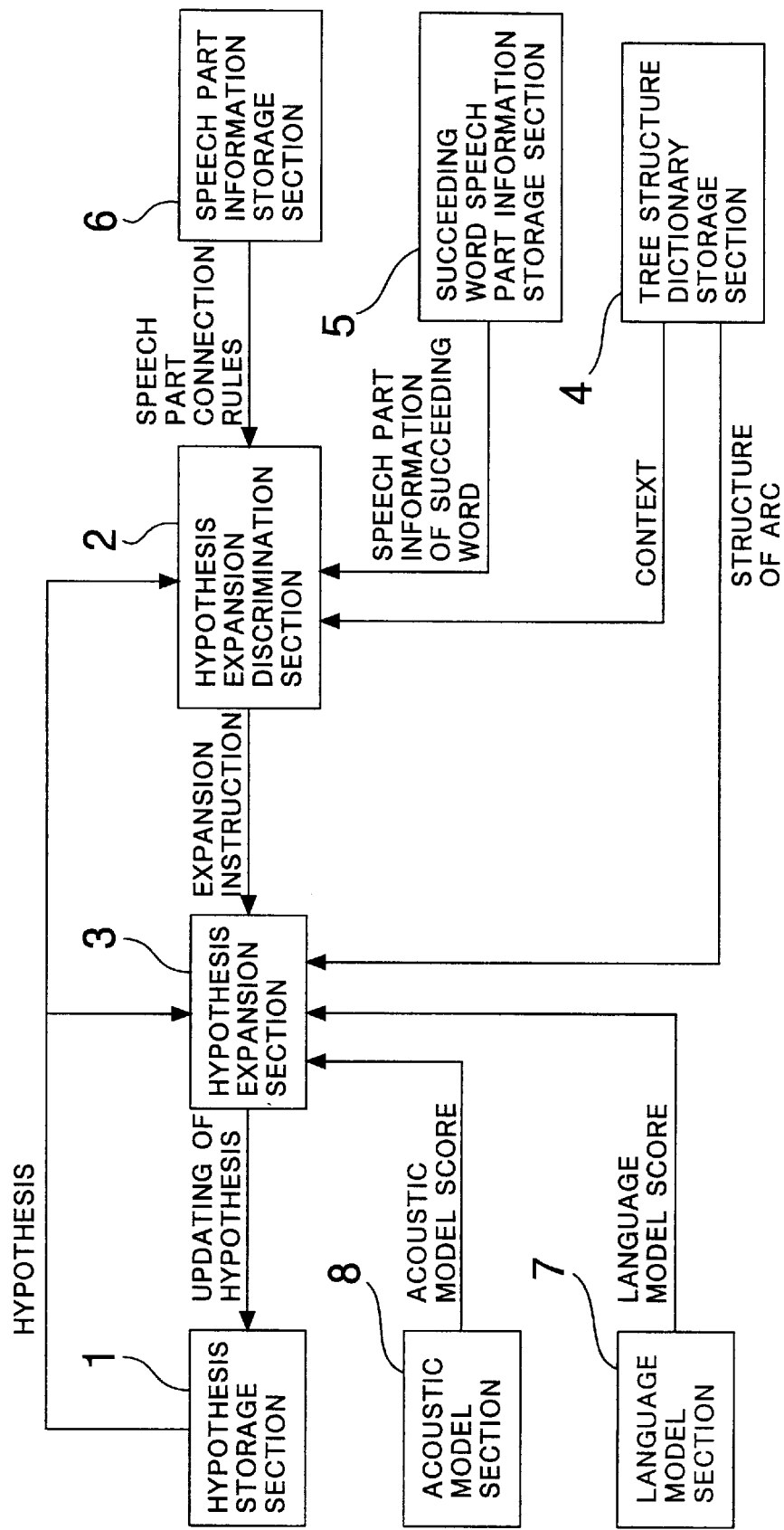
FIG. 1 is a block diagram of a continuous speech recognition apparatus to which the present invention is applied.

FIG. 1 shows a continuous speech recognition apparatus to which the present invention is applied. The continuous speech recognition apparatus uses a frame synchronous beam search. In the following description, only operation of expansion of a hypothesis for one frame in a frame synchronous beam search is described. The other operation of the continuos speech recognition apparatus conforms with that of a frame synchronous beam search.

Figure 2:
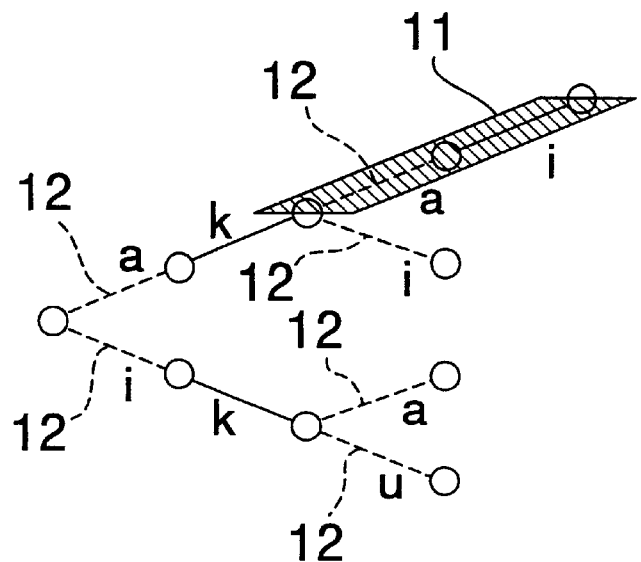
FIG. 2 is a diagrammatic view schematically showing an example of a tree structure dictionary used in the continuous speech recognition apparatus of FIG. 1.

Referring to FIG. 1, the continuous speech recognition apparatus shown includes a hypothesis storage section 1 for storing hypotheses to be used in a search of continuous speech recognition, and a tree structure dictionary storage section 4 for storing contexts and all words which make an object of recognition as tree structure dictionaries (refer to FIG. 2). The tree structure dictionaries are stored separately for the individual contexts.

A succeeding word speech part information storage section 5 stores speech part information of all succeeding words of each arc of a tree structure dictionary. As a manner of storing speech part information, it may be stored as a bit train including bits of "1" and "0" representing presence and absence of speech parts as a next speech part, for example, in the descending order of the speech parts in the frequency of appearance. If 256 different speech parts are available, a storage capacity of 256 bits is required for each arc. It is to be noted that succeeding word speech part information need not be stored for all arcs.

The succeeding word speech part information is required to be stored only for an arc immediately succeeding each node as denoted by 12 in FIG. 2. This is because an arc which does not immediately succeed a node must have succeeding word speech part information quite same as another arc immediately preceding to the arc.

By storing succeeding word speech part information only of arcs immediately succeeding nodes into the succeeding word speech part information storage section 5 in this manner, the required memory capacity can be reduced.

The succeeding word speech part information of each arc of a tree structure dictionary is required to be produced and stored only once before recognition processing is executed. This is because, when recognition processing is executed, the number of words succeeding an arc does not increase or decrease and does not change at all.

Further, also when additional registration of a word is performed to add the word to a tree structure dictionary, the succeeding word speech part information of each arc is required to be reproduced and stored only once.

In contrast, when look-ahead of a bigram is performed, each time a context is determined and a tree structure is produced, calculation of all bigram language models with respect to the context and propagation of provision of language model scores to predecessor arcs must be performed, and therefore, a very large amount of calculation is required.

The succeeding word speech part information is required to be stored by only one piece for each arc, different from a tree structure dictionary which is stored separately for each context.

This is because, if succeeding work speech part information regarding each arc on a tree structure dictionary becomes required, then it is only required to refer to the succeeding word speech part information which is stored by only one piece regarding the arc.

Where look-ahead of a bigram is performed, since it is required to store a bigram language model score for each arc of all tree structure dictionaries, a memory of a very large storage capacity is required. However, in the embodiment of the present invention, since it is only required to store a number of bit trains equal to the number of speech parts for one tree structure dictionary, the required memory capacity is reduced significantly.

Where speech parts appear in the descending order in appearance frequency of "particle", "noun", "verb" and "adjective", a bit train of such a sequence that the first bit of the speech part information of a succeeding word represents that a particle is present (1)/absent (0); the second bit represents that a noun is present (1)/absent (0), . . . is stored.

It is to be noted that, although the succeeding word speech part information need not necessarily be stored in the descending order of speech parts in appearance frequency, in the following description, it is assumed that the succeeding word speech part information is stored in the descending order of speech parts in appearance frequency.

Figure 3:
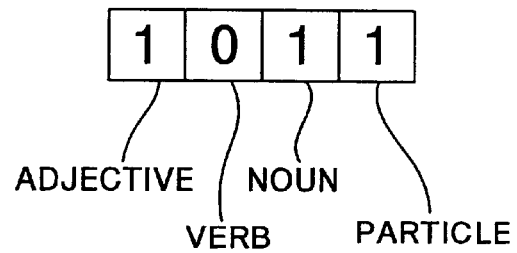
FIG. 3 is a diagrammatic view illustrating an example of succeeding word speech part information in the continuous speech recognition apparatus of FIG. 1.

FIG. 3 illustrates an example of a bit train of succeeding word speech part information when, where the descending order of speech parts in appearance frequency is the particle, noun, verb and adjective, succeeding words of a certain arc include a "particle", a "noun" and an "adjective", but do not include a "verb".

A speech part connection information storage section 6 stores information of all speech parts which can succeed each speech part on the right side. As a manner of storage of the speech information, for example, succeeding speech parts are stored as a bit train including bits of 1 representing that connection is allowed and 0 representing that connection is not allowed in the descending order of speech parts in appearance frequency similarly to the succeeding word speech part information storage section 5.

Figure 4:
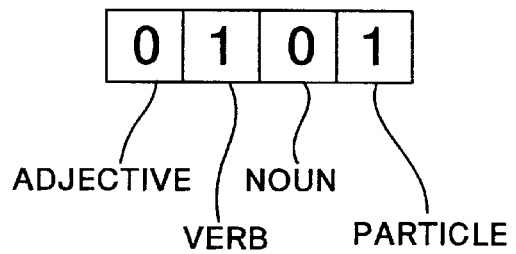
FIG. 4 is a diagrammatic view showing an example of speech part connection information to a particle used in the continuous speech recognition apparatus of FIG. 1.

FIG. 4 illustrates an example of a speech part connection information bit train of a "particle" when a "particle" and a "verb" connect but a "noun" and an "adjective" do not connect to the right side of the "particle" where the descending order of the speech parts in appearance frequency is the "particle", "noun", "verb" and "adjective".

A hypothesis expansion discrimination section 2 receives a context of a tree structure dictionary on which a certain hypothesis is present from the tree structure dictionary storage section 4, receives succeeding word speech part information of an arc immediately succeeding the arc which has the hypothesis, and receives speech part connection information of speech parts which can connect to the right sides of the speech part to which the context received belongs, and then determines from the succeeding word speech part information and the speech part connection information whether or not the hypothesis may be expanded to the succeeding arc.

Where the succeeding word speech part information and the speech part connection information are such as illustrated in FIGS. 3 and 4, respectively, in order to determine whether or not the hypothesis may be expanded to the succeeding arc, the bit train shown in FIG. 3 and the bit train shown in FIG. 4 should be logically ANDed in a unit of a bit, and it should be checked whether or not a result of the operation is "0".

If the result of the operation is not "0", then this signifies that the hypothesis may be expanded to the succeeding arc, but if the operation result is "0", then this signifies that the hypothesis must not be expanded to the succeeding arc.

The reason is that, where the Nth (N is an integer equal to or greater than 0) bit of the speech part connection information is "1", only when the Nth bit of the succeeding word speech part information is "1", a word of a speech part whose connection is permitted is present succeeding the arc and the logical AND of them does not become "0".

For example, where 256 different speech parts are involved, if the computer has a 32-bit CPU, then 256/32=8 operations are required in order to logically AND all of the succeeding word speech part information and the speech part connection information.

On the other hand, where the order in which speech parts are stored is set to the descending order of the speech parts in appearance frequency, the expected value of the number of operations required to obtain a result of the logical AND which is not "0" can be suppressed smaller than 8.

In this manner, to store succeeding word speech part information and speech part connection information in the descending order of speech parts in appearance frequency contributes to high speed operation. It is to be noted that naturally it is possible to store succeeding word speech part information and speech part connection information alternatively in any other order than the descending order of speech parts in appearance frequency and perform connection checking of speech parts corresponding to each other.

It is to be noted that, if a hypothesis is expanded already to an arc immediately succeeding another arc which belongs to the hypothesis, then since it must have been determined in the past that connection is permitted, the hypothesis may be expanded to the succeeding arc unconditionally.

Based on the criterion described above, the hypothesis expansion discrimination section 2 instructs the hypothesis expansion section 3 that expansion of the hypothesis to the succeeding arc is permissible/not permissible.

The hypothesis expansion discrimination section 2 receives an instruction of expansion of the hypothesis to the succeeding arc, acquires a structure of the arc to the succeeding arc from the tree structure dictionary storage section 4 taking scores given thereto from the language model section 7 and the acoustic model section 8 into consideration, and expands the hypothesis only to the arc, to which the hypothesis may be expanded, in accordance with a frame synchronous beam search. It is to be noted that expansion of the hypothesis to the arc itself may be performed unconditionally.

This signifies that, for example, that a hypothesis is present on a certain arc signifies that expansion of the hypothesis to the arc has been permitted in the past.

As described above, in the continuous speech recognition apparatus of the present embodiment, look-ahead of the connection possibility between a linguistic context and words in a tree structure dictionary is performed.

The present invention is effective unless exact look-ahead of a language model score more than a bigram by which the connection possibility between a context and words in a tree structure dictionary can be looked ahead, and a very large amount of calculation or memory capacity for the look-ahead of a bigram language model score is not required.

Figure 5:
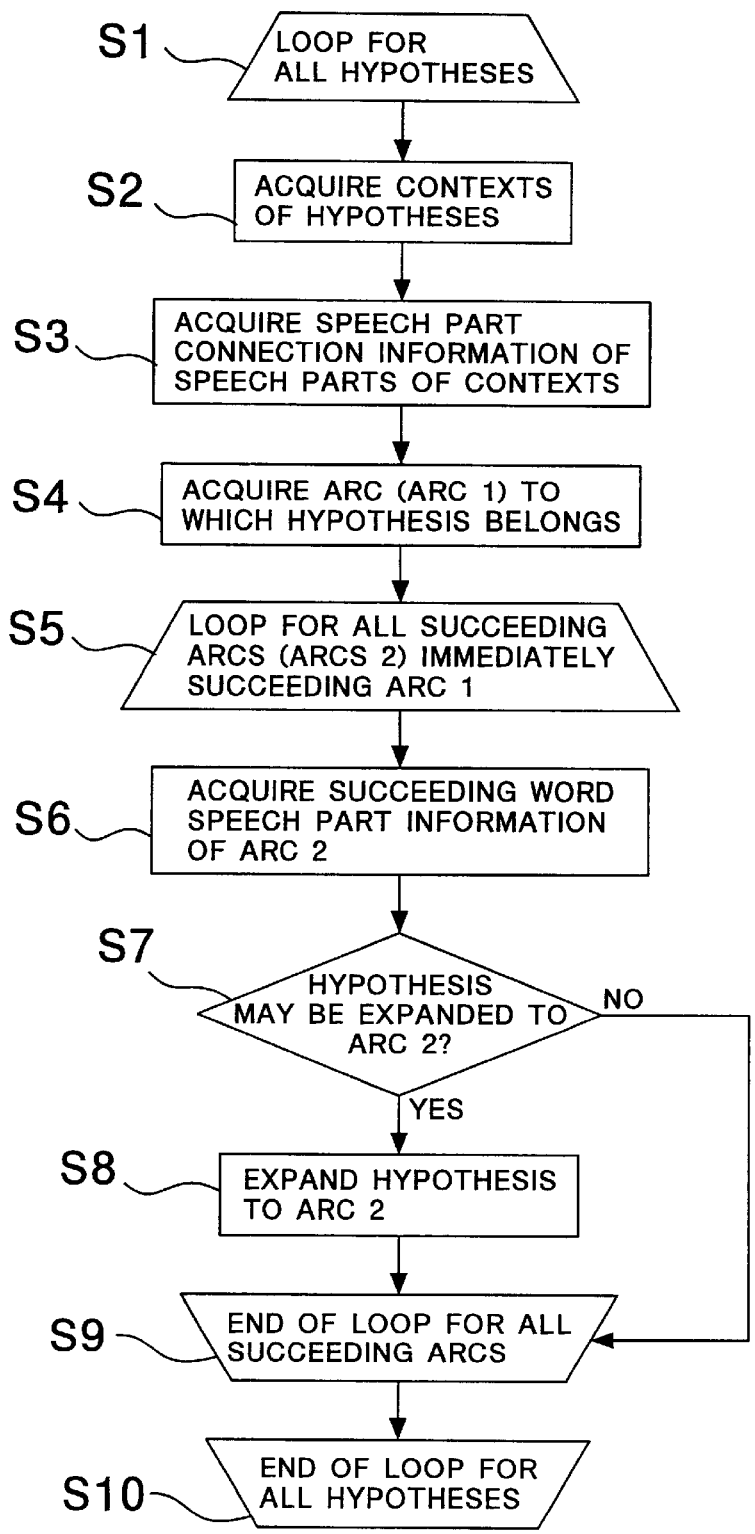
FIG. 5 is a flow chart illustrating operation of the continuous speech recognition apparatus of FIG. 1.
Figure 6:
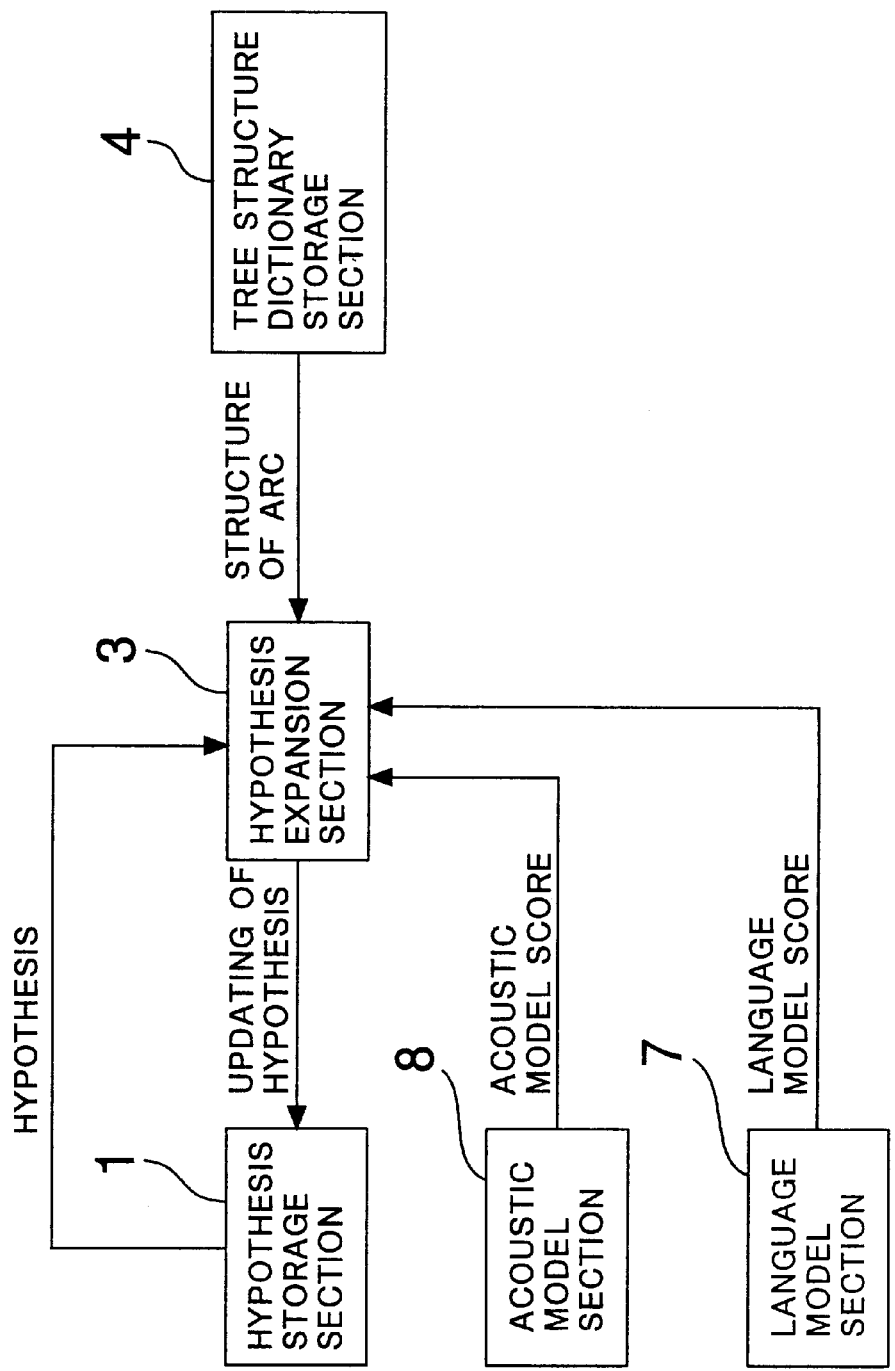
FIG. 6 is diagrammatic view showing a conventional speech recognition apparatus.

FIG. 5 illustrates operation in expansion of a hypothesis for one frame of a frame synchronous beam search.

Referring to FIG. 5, first in step S1, a loop (repetitive processing) regarding all hypotheses which are present at a certain frame time is started.

In step S2, a context of a tree structure to which a hypothesis belongs is acquired from the tree structure dictionary storage section 4.

In step S3, speech part connection information of speech parts of the context is acquired from the speech part connection information storage section 6.

In step S4, an arc in the tree structure to which the hypothesis belongs is acquired from the hypothesis storage section 1. The arc acquired at this time is set as "arc 1".

In step S5, a loop regarding all succeeding arcs directly succeeding the "arc 1" is started. A directly succeeding arc selected now is set to "arc 2".

In step S6, succeeding word speech part information of the "arc 2" is acquired from the succeeding word speech part information storage section 5.

In step S7, it is determined from the speech part connection information acquired in step S3 and the succeeding word speech part information acquired in step S6 whether or not the hypothesis may be expanded from the "arc 1" to the "arc 2". If a connectable speech part included in the speech part connection information is not detected behind the "arc 2", then it is determined that the hypothesis must not be expanded to the "arc 2", and the control branches to step S9. Otherwise, it is determined that the hypothesis may be expanded to the "arc 2", and the control advances to next step S8.

In step S8 (processing by the hypothesis expansion section 3), the hypothesis is expanded to the "arc 2" in accordance with the determination in step S7.

In step S9, it is determined that the processing of the loop regarding all of the arcs is completed. If the processing is completed, then the control advances to step S10, but otherwise, the control returns to step S5.

In step S10, it is determined whether or not the processing of the loop regarding all of the hypotheses is completed. If the processing is completed, then the expansion processing of the hypotheses of the frame in the frame synchronous beam search is ended. If the processing of the loops regarding all of the hypotheses is not completed, then the control returns to step S1. It is to be noted that the processing steps described above with reference to FIG. 5 may be implemented by executing a speech recognition program (software) stored in a memory of a computer (CPU) which forms the speech recognition apparatus. In this instance, the continuous speech recognition method of the present invention can be carried out by reading out the program from a storage medium such as a floppy disc, a CD-ROM or a non-volatile memory, loading the program into the memory and executing the program by means of the CPU.

While a preferred embodiment of the present invention has been described using specific terms, such description is for illustrative purposes only, and it is to be understood that changes and variations may be made without departing from the spirit or scope of the following claims.

What is claimed is:

1. A continuous speech recognition apparatus, comprising:
   a first storage section for storing a tree structure dictionary and a context preceding to the tree structure dictionary therein;
   a second storage section for storing speech part information of all succeeding words of individual arcs in the tree structure dictionary therein;
   a third storage section having connection rules of speech part information stored therein;
   hypothesis expansion discrimination means for referring to the connection rules of speech part information stored in said third storage section to discriminate, with regard to each arc on which a hypothesis is present, whether or not connection between the context of the tree structure dictionary and a succeeding word of the arc is possible and determining based on a result of the discrimination whether or not the hypothesis should be expanded;
   hypothesis expansion means for performing expansion of the hypothesis in response to an expansion instruction from said hypothesis expansion discrimination means;
   whereby the hypothesis is not expanded to the arc of any word which does not connect to the context.

2. A continuous speech recognition apparatus, comprising:
   a hypothesis storage section for storing hypotheses therein;
   hypothesis expansion discrimination means for determining whether or not a hypothesis may be expanded to a succeeding arc;
   a tree structure dictionary storage section for storing a tree structure dictionary and a context preceding to the tree structure dictionary therein;
   a succeeding word speech part information storage section for storing information of whether or not speech parts are included in all of succeeding words present behind each of arcs in the tree structure dictionary;
   a speech part connection information storage section for storing connection information between the speech parts;

means for providing a language model score to a hypothesis;

means for providing an acoustic model score to a hypothesis; and hypothesis expansion means operable in response to an expansion instruction received from said hypothesis expansion discrimination means for acquiring a structure of an arc from said tree structure dictionary storage section and expanding a hypothesis present on the arc to a succeeding arc taking the acoustic model score and the language model score into consideration and then storing a result of the expansion into said hypothesis storage section.

3. A continuous speech recognition apparatus as claimed in claim 2, wherein said speech part connection information storage section stores connection information of the speech parts in the descending order of the speech parts in appearance frequency.

4. A continuous speech recognition apparatus as claimed in claim 2, wherein said succeeding word speech part information storage section stores the information of whether or not the speech parts are included in all of succeeding words present behind each of the arcs in the tree structure dictionary in the descending order of the speech parts in appearance frequency.

5. A continuous speech recognition apparatus as claimed in claim 2, wherein said succeeding word speech part storage section stores succeeding word speed part information regarding only those of the arcs in the tree structure dictionary each of which immediately succeeds a node.

6. A continuous speech recognition apparatus as claimed in claim 2, wherein said hypothesis expansion discrimination means receives speech part information of the context of the tree structure dictionary on which the hypothesis is being expanded from said tree structure dictionary storage section, receives speech part information of all succeeding words to an arc immediately succeeding the arc which has the hypothesis from said succeeding word speech part information storage section, refers to said speech part connection information storage section to discriminate from the received information whether or not the context and the succeeding words can be connected to each other, and delivers, if at least one of the succeeding words is connectable to the context, an instruction to said hypothesis expansion means to expand the hypothesis to the succeeding arc, but delivers, if all of the succeeding words to the arc are not connectable to the context, an instruction to said hypothesis expansion means not to expand the hypothesis without performing expansion of the hypothesis to the succeeding arc.

7. A continuous speech recognition apparatus according to claim 2, wherein said hypothesis expansion discrimination means omits, if a hypothesis is already present on the succeeding arc to which the hypothesis is tried to be expanded, the processing of referring to the connection rules of speech parts and delivers an instruction to said hypothesis expansion means to expand the hypothesis to the succeeding arc.

8. A continuous speech recognition method for a continuous speech recognition apparatus which includes a hypothesis storage section for storing hypotheses therein, a tree structure dictionary storage section for storing a tree structure dictionary and a context preceding to the tree structure dictionary therein, a succeeding word speech part information storage section for storing information of whether or not speech parts are included in all of succeeding words present behind each of arcs in the tree structure dictionary, and a speech part connection information storage section for storing connection information between the speech parts, comprising the step of:

repeating a process for all of hypotheses present at a certain frame time, the process including the steps of:
acquiring a context of a tree structure dictionary to which a hypothesis belongs from said tree structure dictionary storage section;
acquiring speech part connection information of the speech parts of the context from said speech part connection information storage section;
acquiring arcs in the tree structure dictionary to which the hypothesis belongs from said hypothesis storage section; and
repeating, for all succeeding arcs immediately succeeding the arcs, a process including the steps of:
acquiring, where an arc selected at present is represented as first arc and a succeeding arc immediately succeeding the first arc is represented as second arc, succeeding work speech part information of the second arc from said succeeding word speech part information storage section;
discriminating from the acquired speech part connection information and the acquired succeeding word speech part information whether or not the hypothesis may be expanded from the first arc to the second arc and determining that the hypothesis must not be expanded to the second arc if a connectable speech part included in the speech part connection information is not detected behind the second arc, but determining otherwise that the hypothesis may be expanded to the second arc;
expanding the hypothesis to the second arc; and
discriminating whether or not the loop has been completed for all of the hypotheses and ending, when the loop has been completed for all of the hypotheses, the expanding processing of the hypotheses of the frame in a frame synchronous beam search.

9. A recording medium on which a program is recorded for being executed by a computer included in a continuous speech recognition apparatus which includes a hypothesis storage section for storing hypotheses therein, a tree structure dictionary storage section for storing a tree structure dictionary and a context preceding to the tree structure dictionary therein, a succeeding word speech part information storage section for storing information of whether or not speech parts are included in all of succeeding words present behind each of arcs in the tree structure dictionary, and a speech part connection information storage section for storing connection information between the speech parts, the program comprising the step of:

repeating a process for all of hypotheses present at a certain frame time, the process including the steps of:
acquiring a context of a tree structure dictionary to which a hypothesis belongs from said tree structure dictionary storage section;
acquiring speech part connection information of the speech parts of the context from said speech part connection information storage section;
acquiring arcs in the tree structure dictionary to which the hypothesis belongs from said hypothesis storage section; and
repeating, for all succeeding arcs immediately succeeding the arcs, a process including the steps of:
acquiring, where an arc selected at present is represented as first arc and a succeeding arc immediately succeeding the first arc is represented as second arc, succeeding work speech part information of the second arc from said succeeding word speech part information storage section;

discriminating from the acquired speech part connection information and the acquired succeeding word speech part information whether or not the hypothesis may be expanded from the first arc to the second arc and determining that the hypothesis must not be expanded to the second arc if a connectable speech part included in the speech part connection information is not detected behind the second arc, but determining otherwise that the hypothesis may be expanded to the second arc;

expanding the hypothesis to the second arc; and discriminating whether or not the loop has been completed for all of the hypotheses and ending, when the loop has been completed for all of the hypotheses, the expanding processing of the hypotheses of the frame in a frame synchronous beam search.

* * * * *